(12) United States Patent
Palaoro

(10) Patent No.: US 8,312,904 B2
(45) Date of Patent: Nov. 20, 2012

(54) VALVE, TIRE, RIM AND WHEEL

(75) Inventor: Renato Palaoro, Heidenheim (DE)

(73) Assignee: Alligator Ventilfabrik GmbH, Giengen (DE)

( * ) Notice: Subject to any disclaimer, the term of this patent is extended or adjusted under 35 U.S.C. 154(b) by 282 days.

(21) Appl. No.: 12/673,641

(22) PCT Filed: Jul. 18, 2008

(86) PCT No.: PCT/EP2008/005907
§ 371 (c)(1),
(2), (4) Date: Feb. 16, 2010

(87) PCT Pub. No.: WO2009/024220
PCT Pub. Date: Feb. 26, 2009

(65) Prior Publication Data
US 2011/0168314 A1  Jul. 14, 2011

(30) Foreign Application Priority Data
Aug. 17, 2007  (DE) ............ 20 2007 011 583 U

(51) Int. Cl.
*B60C 29/02* (2006.01)

(52) U.S. Cl. .................. 152/427; 137/223; 152/428

(58) Field of Classification Search ............ 152/415, 152/416, 417, 418, 427, 428, 429; 137/223, 137/230
See application file for complete search history.

(56) References Cited

U.S. PATENT DOCUMENTS

| | | | | |
|---|---|---|---|---|
| 2,634,785 A * | 4/1953 | Tubbs | .......... | 152/427 |
| 2,839,120 A | 6/1958 | McCord | | |
| 2,962,073 A * | 11/1960 | Reed | .......... | 152/427 |
| 3,511,295 A | 5/1970 | Kilmarx | | |
| 4,564,056 A | 1/1986 | Doring | | |
| 6,966,331 B2 * | 11/2005 | Simmons et al. | ...... | 137/232 |
| 7,086,412 B2 | 8/2006 | Uleski | | |
| 7,104,274 B2 * | 9/2006 | Sampson | ...... | 137/224 |
| 2004/0136801 A1 * | 7/2004 | Schneider et al. | ...... | 411/3 |

FOREIGN PATENT DOCUMENTS

| | | |
|---|---|---|
| DE | 1871096 | 4/1963 |
| DE | 1902839 | 9/1969 |
| DE | 2038440 | 3/1971 |
| DE | 102004047988 | 6/2005 |

* cited by examiner

Primary Examiner — Kip T Kotter
(74) Attorney, Agent, or Firm — Bachman & LaPointe, P.C.

(57) ABSTRACT

The invention is based on a valve with a valve body (1) having: an air duct (5) which penetrates the valve body (1), in particular in the axial direction (3), and a valve foot (7) which is formed, in particular in one piece, with the valve body (1), on an end (9) of the valve body (1) which is proximal with respect to a rim edge in the installed position, wherein a distal end (8) of the valve body (1) is provided to engage through a valve hole in the rim edge, and the valve foot (7) is provided for arrangement on a tyre-side side of the rim edge. In order to permit easier removal of the valve (10, 20), in particular even on a side of the rim edge facing away from a tyre, the invention provides for the valve foot (7) to be provided to engage through the valve hole, and for a securing element (13, 23) which is separate from the valve body (1) and which projects over the valve foot (7), in particular in the radial direction, to be arranged at the proximal end (9), said securing element (13, 23) being provided for arrangement on a tyre-side side of the rim edge.

32 Claims, 2 Drawing Sheets

VALVE, TIRE, RIM AND WHEEL

FIELD OF THE INVENTION

The invention relates to a valve having a valve body, comprising: an air duct which extends through the valve body in particular in an axial direction, and a valve base which is formed, in particular in one piece, with the valve body at a proximal end of the valve body with respect to a wheel rim edge in the installed position, with a distal end of the valve body being provided for engaging through a valve hole in the wheel rim edge and with the valve base being provided for arranging on a tire-facing side of the wheel rim edge. The invention also relates to a tire and/or a wheel rim and to a wheel having a tire and a wheel rim.

DESCRIPTION OF THE RELATED ART

In a valve of the type specified in the introduction, a valve base is conventionally formed in one piece with the valve body or non-detachably connected to the valve body in some other way, and the valve base conventionally has a transverse extent, aligned perpendicular to the axial direction, whose dimension is greater than a dimension of the valve hole, such that a conventional valve of said type must imperatively be dismounted to the tire-facing side, that is to say into the interior of a wheel. This prevents a valve body from being able to be pushed out, if appropriate also out of a seal, through a valve hole in a wheel rim edge, for example in the event of high pressures. Secondly, comparatively high dismounting forces usually arise for dismounting the valve in the direction of the wheel interior, which forces are conventionally applied at the greatest diameter of the valve base, for example with the support of a special dismounting tool. It is conventional for a dismounting tool of said type to be supported on a rim hump for the purpose of imparting a lever action, as a result of which a comparatively high punctiform introduction of force can damage the rim hump and/or, in the worst case, the tire at the sealing bead. A burr on the rim hump or a cut on the sealing bead can lead to an irreparable defect on the tire. In the worst case, this can result in a creeping or indirect pressure loss. Specifically in the case of a creeping pressure loss, a higher amount of flexing work and the resulting temperature rise in the tire lead to consequential damage and, in the worst case, to rupture of the tire.

It is desirable to enable improved dismounting.

SUMMARY OF THE INVENTION

The invention addresses this; it is the object of the invention to specify a valve, a tire and/or a wheel rim having a valve and a wheel in which the valve can be dismounted more easily, and in which in particular the valve can also be dismounted in the direction of a side of a wheel rim edge facing away from a tire, in particular in the direction of the outside of the wheel.

With regard to the valve, the object is achieved by means of the invention with a valve of the type specified in the introduction in which it is provided according to the invention that the valve base is provided for engaging through the valve hole, and a retaining element which is separate from the valve body and which projects beyond the valve base in particular in the radial direction is arranged on the proximal end, which retaining element is provided for arranging on a tire-facing side of the wheel rim edge.

The invention is based on the consideration that the problems which occur in the prior art arise substantially as a result of a valve base which is inseparably connected to the valve body and which simultaneously serves as a retaining element on a valve hole in the wheel rim edge. Taking said consideration as a starting point, the invention has recognized that a retaining element which is provided separately from the valve body and which projects beyond the valve base preferably in the radial direction can prevent the valve from being pressed out of the valve hole even at high pressures. Furthermore, the concept of the invention provides that, in accordance with the realization, a retaining element of said type may if required expediently be specially designed to be removed from the valve body, since said retaining element is arranged separately from the valve body on the proximal end. By means of the concept of the invention, a valve base has surprisingly been formed which, after the removal of the retaining element, is provided for engaging through the valve hole, such that the valve body as a whole can be removed in the direction of a side of the wheel rim edge facing away from the tire.

With the dismounting of a valve in the direction of the outside of the wheel in accordance with the concept of the invention, the problems of the prior art as mentioned in the introduction are substantially avoided, and furthermore, dismounting of the valve in accordance with the concept of the invention is comparatively simple.

An air duct preferably extends through the valve body substantially in the axial direction. The valve base is preferably formed in one piece with the valve body. Further advantageous refinements of the invention are defined in the sub-claims and specify in detail further advantageous possibilities for realizing the above-explained concept within the context of the object and with regard to further advantages.

The valve base expediently has a transverse extent, aligned perpendicular to the axial direction, whose dimension is smaller than a dimension of the valve hole. This ensures that the valve body, with a valve base which is regularly formed inseparably or integrally on the valve body, can be removed through a valve hole in the wheel rim edge after the retaining element has been removed, in accordance with the concept of the invention, during the dismounting process. The retaining element is preferably provided only for arranging on a tire-facing side of the wheel rim edge; in other words, the retaining element does not engage through the valve hole in the wheel rim edge. The retaining element is expediently not provided for engaging through the valve hole. In particular, it is provided for this purpose that the retaining element has a transverse extent, aligned perpendicular to the axial direction, whose dimension is greater than a dimension of the valve hole.

It has proven to be advantageous for the retaining element to engage behind a stop on the valve body, in particular the valve base. In this way, the retaining element can be fixed to the valve body in a particularly secure and simple manner. The retaining element preferably has for this purpose a stop surface which bears against a side, which faces toward the distal end, of a stop on the valve body, in particular of the valve base.

In accordance with the concept of the invention, the retaining element is not only formed separately from the valve body but rather furthermore is fixed to the valve body in a removable fashion. In other words, the retaining element is designed to be removable from the valve body. The retaining element is preferably formed from a hard material, or a material which has only a low or limited degree of elasticity. For example, the retaining element may be formed from a brittle material, in particular an easily destructible material such as, for example, a brittle or hard plastic or the like. The retaining element may also be metallic. It has been found that fundamentally a wide variety of shapes and materials of a removable retaining element may be realized—independently of this, two variants have proven to be particularly advantageous.

In a first variant, it has proven to be particularly advantageous for the retaining element to project beyond the valve base about the full circumference. In this way, it is possible to obtain particularly uniform and secure contact of the retaining element against the valve body. The retaining element is for this purpose advantageously formed in the manner of a holed disk.

In a second variant, the retaining element can project beyond the valve base about a part of the circumference. This has proven to be particularly advantageous with regard to the removability of the retaining element. For this purpose, the retaining element may in particular be formed in the manner of a ring segment.

To realize particularly advantageous removability of the retaining element, it has expediently proven to be expedient for the retaining element to have a predetermined breaking point, in particular in the form of a breaking crease. Realizing the removability in this way has proven to be particularly expedient for a retaining element which projects beyond the valve base about the full circumference, for example in the form of a holed disk with one or more breaking creases. A retaining element of said type can be easily separated from the valve body, without using a conventional tool, by destroying the predetermined breaking point.

In addition, or alternatively, the retaining element may also be attached to the valve body by means of a force fit, and in particular have a circumferential clamping opening. Realizing the removability in this way has proven to be particularly advantageous in the second variant. A retaining element of said type can be particularly easily pulled off the valve body, while overcoming the clamping force of the retaining element, with or without a conventional tool.

In particular a retaining element which projects beyond the valve base about a part of the circumference, expediently a retaining element according to the second variant, is secured radially at the outside. It is fundamentally also possible for a retaining element according to the first variant to be secured radially at the outside. Such securing is configured in particular to prevent an inadvertent release of the retaining element, for example a release as a result of centrifugal force.

Securing can be realized particularly advantageously by means of a sealing element which engages around the retaining element, for example a sealing element composed of rubber or the like. In this way, the function of the sealing element is simultaneously utilized to secure the retaining element. The sealing element may completely or at least partially surround the retaining element for example radially at the outside.

The sealing element is particularly advantageously fixed in a positively locking manner to the valve body. One refinement of the invention realizes particularly slip-free fixing of the sealing element to the valve body which goes beyond purely frictionally engaging fixing of the sealing element to the valve body arising from pressing force. In one particularly preferred refinement of the invention, it is provided for this purpose that the valve body has a profiling, which is arranged on the outer circumference, to prevent a sealing element, which correspondingly likewise has a matched profiling, from slipping. For example, a bulge or groove or edge or the like is suitable.

A sealing element fundamentally has, about the outer circumference, a profiling which is matched to the wheel rim edge profile; this serves particularly to optimize a sealing action of the sealing element.

The valve expediently has a valve needle in the air duct at the distal end, and/or a fastening means on the valve body for a closure cap.

It has been found that a sealing element according to the concept of the invention or one or more refinements of said sealing element is particularly advantageously designed in the form of a CV valve (commercial vehicle valve) for a commercial vehicle.

The concept of the invention also encompasses, for achieving the object, a tire and/or a wheel rim having a valve according to the invention or a refinement thereof.

The invention also encompasses, for achieving the object, a wheel having a tire and a wheel rim and a valve according to the concept of the invention or a refinement thereof.

BRIEF DESCRIPTION OF THE DRAWINGS

Exemplary embodiments of the invention will now be described on the basis of the drawing. The latter is intended to illustrate the exemplary embodiments not necessarily to scale, the drawing is rather in schematic and/or slightly distorted form where expedient for explanation. With regard to additions to the teachings which can be directly gathered from the drawing, reference is made to the relevant prior art. Here, it should be noted that numerous modifications and changes with regard to the form and detail of an embodiment may be carried out without departing from the general concept of the invention. The features of the invention disclosed in the description, in the drawing and in the claims may be essential to the refinement of the invention both individually and also in any desired combination. Furthermore, the scope of the invention also encompasses all combinations of at least two of the features disclosed in the description, the drawing and/or the claims. The general concept of the invention is not restricted to the exact form or the detail of the preferred embodiment shown and described below, or restricted to a subject matter which would be restricted in relation to the subject matter claimed in the claims. Where dimensional ranges are specified, values within said limits should also be disclosed and usable and claimable in any desired way.

In detail, in the drawing.

DETAILED DESCRIPTION

Figure 1A:
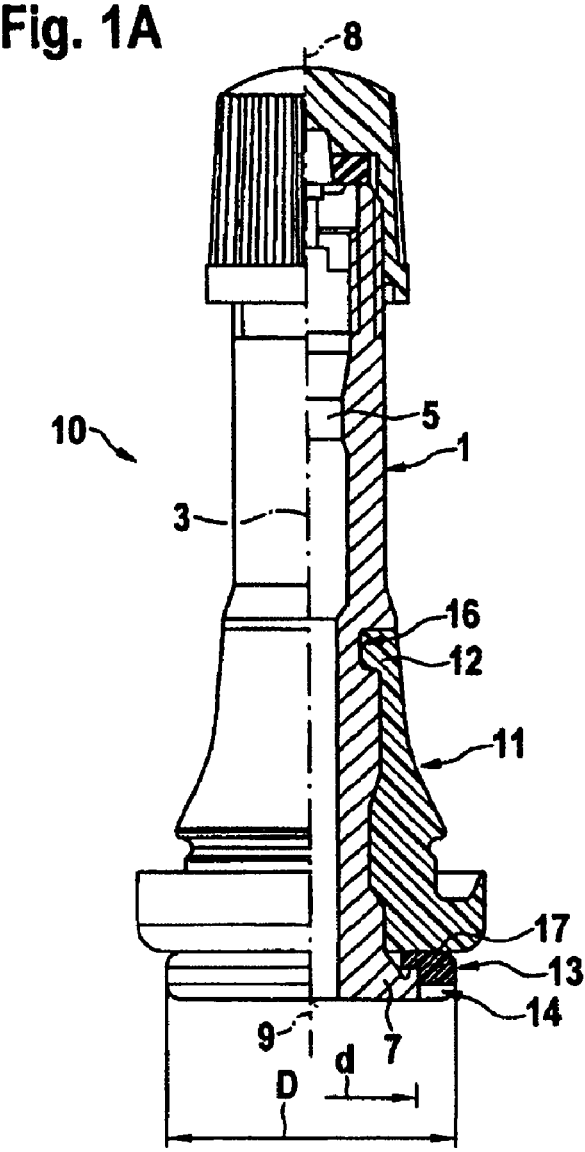
FIG. 1 shows a first particularly preferred embodiment of a valve according to a first variant, in a perspective partial cross section in view A, and views B and C show the retaining element in a design according to the first variant in plan and side views.
Figure 1B:
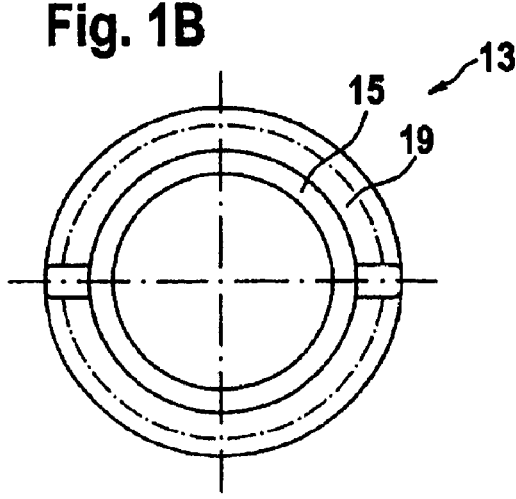
Figure 1C:
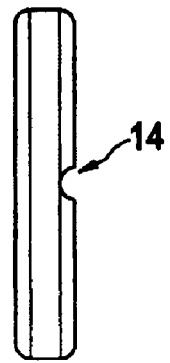

FIG. 1 shows, in view A, a first embodiment of a valve 10 having a valve body 1 which has an air duct 5 extending through the valve body 1 in the axial direction 3 and which has a valve base 7 formed in one piece with the valve body 1, which valve base 7 is arranged at a proximal end 9 of the valve body 1 with respect to a wheel rim edge in the installed position. At the distal end 8, a valve needle is arranged in the air duct 5 and the valve body 1 bears a closure cap. A distal end 8 of the valve body is provided for engaging through a valve hole in a wheel rim edge and the valve base 7 is provided for arranging on a tire-facing side of the wheel rim edge.

In accordance with the concept of the invention, the valve base 7 is provided for engaging through the valve hole and, in the present case, has a transverse extent, aligned perpendicular to the axial direction, whose dimension d is smaller than a dimension of the valve hole. The wheel rim edge at the valve hole is provided for bearing at the outside against a sealing element 11 which surrounds the valve body 1 and which is correspondingly profiled.

To prevent the valve 10 according to the concept of the invention from being pressed out of the valve hole even at high pressures, a retaining element 13 which projects beyond the valve base 7 in the radial direction is arranged on the proximal end 9 separately from the valve body 1 and is provided for arranging on a tire-facing side of the wheel rim edge.

The retaining element 13 is illustrated in greater detail in views B and C of FIG. 1 and, in the present case, is formed from a non-elastic, comparatively brittle plastic which can be easily destroyed by means of a screwdriver or similar conventional tool. According to the concept of the invention, the retaining element 13 is not provided for engaging through the valve hole and, for this purpose, has a transverse extent, aligned perpendicular to the axial direction 3, whose dimension D is greater than a dimension of the valve hole. For fixing to the valve body, the retaining element 13 engages behind a stop on the valve body, which stop is in the present case provided in the form of the valve base 7. For this purpose, the retaining element 13 has a stop surface 15 which bears against a side 17, which faces toward the distal end 8, of the valve base 7.

According to the concept of the invention, the retaining element 13 is removably fixed to the valve body 1. According to the first variant illustrated in FIG. 1, the retaining element 13 for this purpose surrounds the valve body 1 about the full circumference and likewise projects beyond the valve base 7 about the full circumference, such that the retaining element 13, which is formed in the present case in the manner of a holed disk, bears particularly effectively and uniformly against the valve base 7, and the edge 19 which projects beyond the stop surface 15 prevents the valve from being pressed out at the wheel rim edge of the valve hole.

To remove the retaining element 13 in the form of the holed disk from the valve body 1, said retaining element 13 has a predetermined breaking point 14 in the form of a breaking crease which is designed such that it can be opened by being destroyed using a conventional tool. On account of the transverse dimension d of the valve base 7 being smaller than the valve hole, the valve body 1 as a whole can then be pulled out through the valve hole toward that side of the wheel rim edge which faces toward the tire, that is to say toward the outside of the wheel, through the valve hole in the wheel rim edge. The usual problems of dismounting at the wheel inner side, such as are encountered with conventional valves, are eliminated because tools are kept clear of the wheel rim inner edge and the tire during the dismounting process.

Figure 2A:
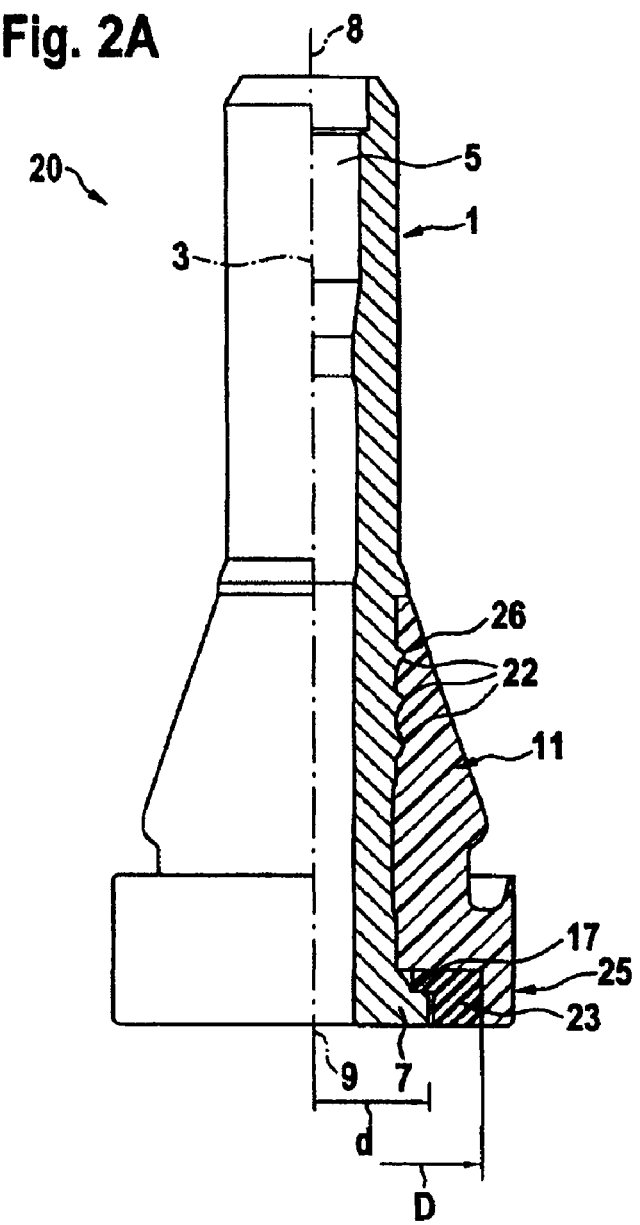
FIG. 2 shows a second particularly preferred embodiment of a valve according to a second variant, in a perspective partial cross section in view A, and views B and C show the retaining element in a design according to the first variant in plan and side views.
Figure 2B:
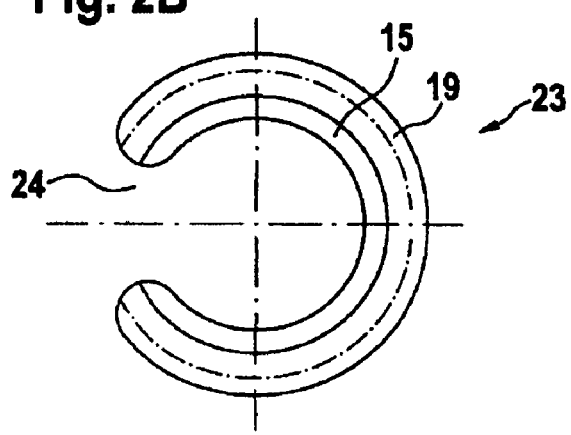
Figure 2C:
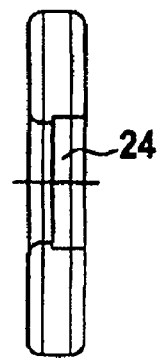

FIG. 2 shows a further embodiment of a valve 20 according to a second variant, in which the same reference numerals are used for identical parts or parts of identical function. In contrast to the first embodiment of a valve 10 according to the first variant shown in FIG. 1, in the valve 20, the retaining element 23 surrounds the valve body 1 about a part of the circumference, and projects beyond the valve base 7 over a part of the circumference. Here, the retaining element 23 is formed in the manner of a ring segment which is in this case metallic and which is shown in views B and C of FIG. 2. The ring segment has a clamping opening 24 which can be pushed over the shank of the valve body 1 such that the retaining element 23 is attached to the valve body by means of a force fit. For dismounting, the ring segment can be pulled off the valve body 1 and is fundamentally prevented from being inadvertently removed from the valve body 1 by means of the clamping action exerted in the force fit. As an additional securing facility—in contrast to the valve 10 of FIG. 1 in the present case—the sealing element 11 engages around the retaining element 23 such that, in the present case, the retaining element is prevented from sliding out even under high centrifugal forces on account of its clamping opening 24 and the sealing element 11. The sealing element 11 has for this purpose an extension in the form of a collar 25 which surrounds the retaining element 23 about the full circumference.

In the embodiment of a valve 10 shown in FIG. 1 and also in the embodiment of a valve 20 shown in FIG. 2, the sealing element 11 is fundamentally fixed in a frictionally engaging manner to the valve body 1 with an accurate fit, and this alone serves to produce a suitable resistance force between the sealing element 11 and valve body 1, which resistance force substantially prevents the sealing element 11 from sliding relative to the valve body 1.

Furthermore, the sealing element 11 is fixed in a positively locking manner to the valve body 1 in both the valve 10 and the valve 20.

In the valve 10, the sealing element 11 has for this purpose a profiling in the form of an inwardly directed bulge 12 which engages into a corresponding profiling in the form of a latching groove 16 of the valve body 1, such that a slip-preventing facility is additionally realized which prevents the sealing element 11 from slipping back during the pulling-in process and during the rest of the mounting process of the valve 10. Pulling-in forces into the valve hole are additionally substantially reduced.

Positively locking fixing of the sealing element 11 to the valve body 1 is likewise realized in the embodiment of a valve 20 shown in FIG. 2. In the valve 20, in contrast to the valve 10, a profiling in the form of a number of—in the present case three—indentations 22 are provided for this purpose on the sealing element, into which indentations 22 a corresponding profiling in the form of latching edges 26 on the valve body 1 of the valve 20 engage. In a sealing element not shown here, it is fundamentally possible for a combination of the above-mentioned positively locking fixings to be realized. Other positively locking fixings of a sealing element may additionally or alternatively also prove to be expedient. Overall, it is possible depending on expediency to realize adequate jamming of the sealing element 11 during the pulling-in process of the valve.

The invention is based on a valve 10, 20 having a valve body 1, comprising: an air duct 5 which extends through the valve body 1 in particular in an axial direction 3, and a valve base 7 which is formed, in particular in one piece, with the valve body 1 at a proximal end 9 of the valve body 1 with respect to a wheel rim edge in the installed position, with a distal end 8 of the valve body 1 being provided for engaging through a valve hole in the wheel rim edge and with the valve base 7 being provided for arranging on a tire-facing side of the wheel rim edge. To enable simpler dismounting of the valve 10, 20, in particular also in a side, which faces away from a tire, of the wheel rim edge, the invention provides that the valve base 7 is provided for engaging through the valve hole, and a retaining element 13, 23 which is separate from the valve body 1 and which projects beyond the valve base 7 in particular in the radial direction is arranged on the proximal end 9, which retaining element 13, 23 is provided for arranging on a tire-facing side of the wheel rim edge.

The invention claimed is:

1. A valve (10, 20) having a valve body (1) and a sealing element (11), comprising:
   an air duct (5) which extends through the valve body (1) and a valve base (7) which is formed with the valve body (1) at a proximal end (9) of the valve body (1) with respect to a wheel rim edge in the installed position, with a distal end (8) of the valve body (1) being provided for engaging through a valve hole in the wheel rim edge and with the valve base (7) being provided for arranging on a tire-facing side of the wheel rim edge and for engaging through the valve hole,
   wherein the sealing element (11) engages through the valve hole, and a retaining element (13, 23) which is separate from the valve body (1) and which projects radially beyond the valve base (7) is arranged on the proximal end (9) between the valve base (7) and the sealing element (11), which retaining element (13, 23) is provided for arranging on a tire-facing side of the wheel rim edge, with the retaining element (13, 23) being fixed to the valve body (1) in a removable fashion and being formed from a hard material, and
   wherein the retaining element (13, 23) has a stop surface (15) which bears against a side (17), which faces toward the distal end (8), of a stop on the valve body (1).

2. The valve (10, 20) as claimed in claim 1, wherein the valve base (7) has a transverse extent, aligned perpendicular to the axial direction (3), whose dimension (d) is smaller than a dimension of the valve hole.

3. The valve (10, 20) as claimed in claim 2, wherein the valve base (7) is formed in one piece with the valve body (1).

4. The valve (10, 20) as claimed in claim 1, wherein the retaining element (13, 23) is not provided for engaging through the valve hole.

5. The valve (10, 20) as claimed in claim 4, wherein the retaining element (13, 23) has a transverse extent aligned perpendicular to the axial direction (3), whose dimension (D) is greater than a dimension of the valve hole.

6. The valve (10, 20) as claimed in claim 1, wherein the retaining element (13, 23) is provided only for arranging on a tire-facing side of the wheel rim edge.

7. The valve (10, 20) as claimed in claim 6, wherein the retaining element engages behind a stop on the valve body (1).

8. The valve (10, 20) as claimed in claim 6, wherein the retaining element engages behind a stop on the valve base (7).

9. The valve (10, 20) as claimed in claim 1, wherein the retaining element (13) projects beyond the valve base (7) about the full circumference.

10. The valve (10, 20) as claimed in claim 9, wherein the retaining element (13) is formed in the manner of a holed disk.

11. The valve (10, 20) as claimed in claim 1, wherein the retaining element (23) projects beyond the valve base (7) about a part of the circumference.

12. The valve (10, 20) as claimed in claim 11, wherein the retaining element (13) is formed in the manner of a ring segment.

13. The valve (10, 20) as claimed in claim 1, wherein the retaining element (13) has a predetermined breaking point (14).

14. The valve (10, 20) as claimed in claim 13, wherein the breaking point is a breaking crease.

15. The valve (10, 20) as claimed in claim 1, wherein the retaining element (23) is attached to the valve body (1) by means of a force fit.

16. The valve (10, 20) as claimed in claim 15, wherein the retaining element (23) has a circumferential clamping opening (24).

17. The valve (10, 20) as claimed in claim 1, wherein the retaining element (23) is secured radially at an outside edge of the retaining element.

18. The valve (10, 20) as claimed in claim 17, wherein the retaining element (23) projects beyond the valve base (7) about a part of the circumference.

19. The valve (10, 20) as claimed in claim 1, wherein the retaining element (23) is at least partially surrounded radially at an outside edge of the retaining element by the sealing element (11) which engages around the retaining element.

20. The valve (10, 20) as claimed in claim 19, wherein the retaining element projects beyond the valve base (7) about a part of the circumference.

21. The valve (10, 20) as claimed in claim 19, wherein the sealing element (11) is composed of rubber.

22. The valve (10, 20) as claimed in claim 19, wherein the sealing element (11) engages around the retaining element (23) by means of a collar (25) formed around the retaining element (23).

23. The valve (10, 20) as claimed in claim 1, wherein the sealing element (11) is fixed in a positively locking manner to the valve body (1).

24. The valve (10, 20) as claimed in claim 1, wherein the valve body (1) and/or the sealing element (11) have/has a profiling to prevent the sealing element (11) from slipping.

25. The valve (10, 20) as claimed in claim 1, wherein the sealing element (11) has, about the outer circumference, a profiling which is matched to the wheel rim edge profile.

26. The valve as claimed in claim 25, wherein the profiling is defined by spaced radially extending portions of the sealing element (11) for engaging on distal and proximal surfaces of the wheel rim edge.

27. The valve (10, 20) as claimed in claim 1, wherein the air duct (5) extends through the valve body (1) in the axial direction (3).

28. The valve (10, 20) as claimed in claim 1, wherein a fastening means for a closure cap is formed on the valve body (1) at the distal end (8).

29. The valve (10, 20) as claimed in claim 1, in the form of a CV valve for a commercial vehicle.

30. A tire and/or wheel rim having a valve (10, 20) as claimed in claim 1.

31. A wheel having a tire and a wheel rim and a valve (10, 20) as claimed in claim 1.

32. A valve (10, 20) having a valve body (1) and a sealing element (11), comprising:
   an air duct (5) which extends through the valve body (1) and a valve base (7) which is formed with the valve body (1) at a proximal end (9) of the valve body (1) with respect to a wheel rim edge in the installed position, with a distal end (8) of the valve body (1) being provided for engaging through a valve hole in the wheel rim edge and with the valve base (7) being provided for arranging on a tire-facing side of the wheel rim edge and for engaging through the valve hole,
   wherein, the sealing element (11) engages through the valve hole, and a retaining element (13, 23) which is separate from the valve body (1) and which projects radially beyond the valve base (7) is arranged on the proximal end (9) between the valve base (7) and the sealing element (11), which retaining element (13, 23) is provided for arranging on a tire-facing side of the wheel rim edge, with the retaining element (13, 23) being fixed to the valve body (1) in a removable fashion and being formed from a hard material, and wherein the retaining element (13, 23) has a stop surface (15) which bears against a side (17), which faces toward the distal end (8), of a stop on the valve base (7).

* * * * *